United States Patent
Bocheck

(10) Patent No.: US 7,925,541 B2
(45) Date of Patent: Apr. 12, 2011

(54) METHOD, SYSTEM, AND MEDIUM FOR CONDUCTING BARTER TRANSACTIONS

(75) Inventor: Paul Bocheck, New York, NY (US)

(73) Assignee: JPM Global, Inc., New York, NY (US)

( * ) Notice: Subject to any disclaimer, the term of this patent is extended or adjusted under 35 U.S.C. 154(b) by 675 days.

(21) Appl. No.: 11/977,857

(22) Filed: Oct. 26, 2007

(65) Prior Publication Data

US 2008/0103986 A1  May 1, 2008

Related U.S. Application Data

(60) Provisional application No. 60/863,343, filed on Oct. 27, 2006.

(51) Int. Cl.
*G06Q 30/00* (2006.01)
(52) U.S. Cl. .................. 705/26.1; 705/26.4; 705/37
(58) Field of Classification Search .............. 705/26, 705/27, 37
See application file for complete search history.

(56) References Cited

U.S. PATENT DOCUMENTS

| | | | |
|---|---|---|---|
| 5,794,207 A * | 8/1998 | Walker et al. | 705/77 |
| 6,282,521 B1 * | 8/2001 | Howorka | 705/36 R |
| 6,847,938 B1 * | 1/2005 | Moore | 705/26 |
| 7,158,956 B1 * | 1/2007 | Himmelstein | 705/80 |
| 7,587,370 B2 * | 9/2009 | Himmelstein | 705/80 |
| 7,593,871 B1 * | 9/2009 | Mesaros | 705/26 |
| 7,617,128 B2 * | 11/2009 | Greak | 705/26 |
| 2003/0069827 A1 | 4/2003 | Gathman et al. | |
| 2003/0163392 A1 * | 8/2003 | Banerjee et al. | 705/27 |
| 2004/0083195 A1 | 4/2004 | McCord et al. | |
| 2006/0080226 A1 * | 4/2006 | Pickering | 705/37 |
| 2007/0055607 A1 * | 3/2007 | Wunsch et al. | 705/37 |
| 2007/0255624 A1 * | 11/2007 | Boesel | 705/26 |

OTHER PUBLICATIONS

BarterQuest, Feb. 5, 2005 http://web.archieve.org/web/20050205192146/barterquest.com/*
International Search Report for PCT Appln. No. PCT/US07/22700 (Form PCT/ISA/210 dated Apr. 8, 2008.
Form PCT/ISA/237 (Written Opinion of the International Searching Authority) dated Apr. 8, 2008.
Office Action from the U.S. Patent and Trademark Office dated Jul. 28, 2010 issued in connection with a related U.S. Appl. No. 11/977,853 (15 pages).
Office Action issued Feb. 17, 2011 in related U.S. Appl. No. 1/977,877 (19 pages).

* cited by examiner

*Primary Examiner* — Yogesh C Garg
*Assistant Examiner* — Matthew Zimmerman
(74) *Attorney, Agent, or Firm* — Robert P. Michal, Esq.; Lucas & Mercanti, LLP

(57) ABSTRACT

Method and system for bartering between trade parties each having one or more items available for barter, via a communications network. Items available for trade are listed and the parties can browse and search the lists to locate items they want to acquire and items they have available to trade. Each party can make an offer to trade with another party subject to various conditions and requirements relating to, for example, a requirement to maintain an item offered for trade available for a certain period of time.

30 Claims, 6 Drawing Sheets

METHOD, SYSTEM, AND MEDIUM FOR CONDUCTING BARTER TRANSACTIONS

CROSS-REFERENCE TO RELATED APPLICATION

This application claims priority under 35 USC 119(e) of U.S. Provisional Application No. 60/863,343 filed Oct. 27, 2006, the entire disclosure of which is incorporated herein by reference.

FIELD OF THE INVENTION

The present invention relates generally to a method and system for conducting barter transaction between two or more parties and more specifically, to a method and system capable of conducting barter transaction between parties over a communications network such as the Internet while providing for secure shipment of the items so that all items involved in the transaction are assured of delivery to the acquiring party.

BACKGROUND OF THE INVENTION

The Internet, also referred to as the World Wide Web, comprises a vast number of computers connected by computer networks which themselves are joined together by means of Web servers, switches, routers, base stations, and gateways which enable transfer of packets of data between computers using a TCP/IP suite of protocols. The interconnected computers and Web servers exchange information using various services, such as electronic mail (or email), ftp, and the Hypertext Transfer Protocol (HTTP). In view of its open protocol nature, the Internet facilitates unprecedented instant interconnections between users, companies, and governments that were not even dreamed of a decade ago.

With the invention of the Internet, new global business opportunities surfaced. In view of its global nature, the Internet is especially useful for conducting electronic commerce.

Many Web servers have been developed and utilized by vendors to advertise and sell products. The products can be tangible items (e.g., books, CD's, collectibles, etc.) that are delivered through conventional distribution channels (e.g., a common mail carrier), items that are delivered electronically to the purchaser over the network or Internet, or items that are electronically confirmed only (e.g., rights of use timeshare). Internet commerce does not only copy the brick and mortal storefront to extend its reach to global markets, it has also enabled the birth of new businesses that would not be possible to form without the capability of reaching millions of users.

Besides a traditional Internet marketplace's sell and purchase transactions, a Web server computer system may also be built to provide an electronic version of classified advertisements or classifieds. Such systems list items that are available for sale, purchase, or trade. In the past, classifieds were traditionally in print media at local newspapers or posted at local supermarkets or clubs. With the advent of the Internet, an electronic bulletin board and classifieds can grow to include users outside of a local area.

For example, in a typical electronic bulletin board or classifieds model, a user, who wishes to offer item for sale, may list one or more items he owns on the Web site. This listing information may include, among others things, the seller's name, address, email address, and telephone number and possibly credit card number or other payment account if a listing fee is charged. Another user, who is a potential buyer, may browse through the electronic bulletin board using the Internet and a Web browser and select various items that he wishes to buy. In one implementation, once the other user selects the items, the actual sale/purchase is accomplished outside of the electronic platform. In another implementation, when the user has completed selecting the items to be purchased, the server computer system then prompts the potential buyer for additional information, such as shipping information and a credit card number, in order to complete the trade. The server computer system then typically confirms the order by sending a confirming email to the client computer system and informs the seller to ship the item.

Although this traditional "electronic bulletin board" or "classifieds" model is very flexible and intuitive, it has several major downsides. It can facilitate a sale or purchase of items independent of each other only, but not for barter. In other words, only one transaction, sale, or purchase, at a time is executed. In addition, the overhead of searching and confirming the various steps of the sale or purchase process, including waiting for, viewing, and updating the item-specific information, can be very high. This overhead makes the electronic bulletin board or classifieds model cumbersome.

Although some more advanced "electronic bulletin boards" allow users to specify items for barter, they allow specifying only one item "wanted" for each item available. The inability to specify multiple "wanted" items for each item listed makes trade transactions difficult to complete. In addition, those "wanted" items, as described by the user, may not be well described. It would thus be desirable to allow the system to specify items wanted "by example" by selecting from previously listed items for trade.

"Electronic bulletin boards" also lack efficient automated matching capability to find potential trades. Although a manual search for potential trades involving only two participants is, in general, feasible, search for multiparty trades and coordinating of multiparty barter without automated tools is, at least, cumbersome.

It is believed that existing electronic bulletin boards do not support trade or bartering between a plurality of users. Most, if not all, such existing systems do not have any means for forming and confirming multi-party trades between multiple users. There is thus a need to provide an efficient platform for trades between pluralities of parties that takes advantage of currently available processing power of computer systems. A computerized barter system is thus needed for fast search and matching between traders and for "expedited" trade closing without providing "repeated" information for each trading step.

Once a trade is closed, when the trade involves tangible goods, then the items must be shipped to the other traders. When traders close a trade, they are typically required to deliver the item they own to the other user. Since the items are usually not shipped from a central location, there is a little control as to if and when items are shipped and received. Although it will not be possible to inspect individual shipments for contents, a method for secure shipment of tangible items being traded is needed to eliminate cases when traders close trade and do not ship items.

In a typical electronic bulletin board, the user, who is a potential buyer, has limited search capabilities for items he is interested in acquiring. A returning user, typically regarded as a "guest" until login, cannot search for items he is interested without specifically describing search conditions each time he is conducting a search. A system is therefore needed that allows users to quickly and efficiently search for items of interest without logging into the system each time.

An efficient matching method that allows traders save time and money by shortening both the searching process and the final negotiation process is clearly an important factor for further advances in eCommerce. As described more fully below, the present invention proposes, among other things, a system that automatically matches potential trade partners that are likely to agree with a barter transaction. It would therefore be of great interest to eCommerce participants to use systems that embody the present invention while trying to improve their efficiency and profitability.

OBJECTS AND SUMMARY OF THE INVENTION

It is an object of the present invention to provide a new method and system for conducting barter transaction between two or more parties.

It is another object of the present invention to provide a new method and system capable of conducting multi-party barter and barter transactions between three or more parties over a communications network such as the Internet, which in some cases, overcomes deficiencies of current barter systems.

Another object of the present invention is to provide a system allowing individual users across the world to engage in barter trade without cash, specifically, via a communications network such as the Internet.

In order to achieve one or more of these objects and possibly others, one embodiment of a method and system in accordance with the invention involves a computerized classifieds listing system for implementing and coordinating cashless barter between a plurality of trade parties each having one or more items available for barter, via one or more communications networks, preferably the Internet. In particular, the method and system enable a description of items offered for barter to be provided over a communications network, for an efficient browsing and search within a barter database, for an automated matching and creating of potential two-party and multiparty trades, and for arrangement of a shipment of bartered items between two or more parties.

In one embodiment, users of the invention enter data describing items they offer for barter, items they are willing to accept, and criteria regarding the trade, from the client system to a central barter database residing, for example, on a central computer. In particular, they can describe items they offer for barter and items they are willing to trade "virtually," e.g., by use of a search or query of current and/or archive databases listing items offered for barter.

Once a barter transaction is approved, the invention allows for an efficient method for shipping the goods between two or more parties involved in the transaction. Once two or more users agree to barter the items, a processor presents users with an option to arrange for secure shipment of the items. Although arrangement for shipment of items is done asynchronously by each user individually or independently, all shipments are executed conditionally when all parties arrange a shipment of their items.

The principles of the invention may be fully understood by reference to the following drawings, illustrating several embodiments of the present invention.

BRIEF DESCRIPTION OF THE DRAWINGS

The invention may best be understood by reference to the following detailed description of and illustrative embodiment when read in conjunction with the accompanying drawings, wherein.

DETAILED DESCRIPTION OF PREFERRED EMBODIMENTS

Figure 1:
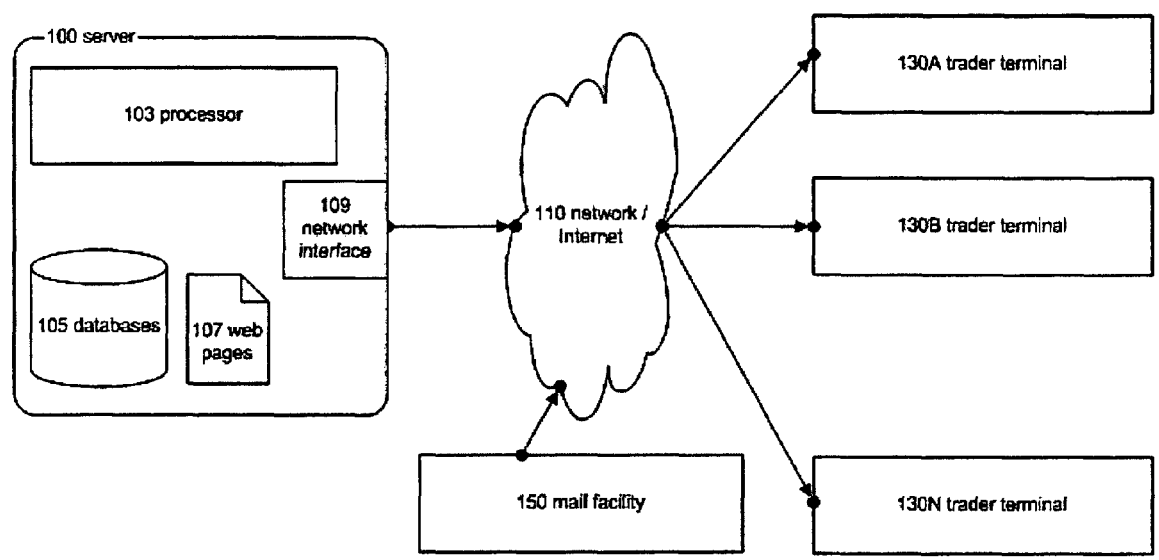
FIG. 1 shows a general architecture of the barter system in accordance with the invention.

Referring to the accompanying drawings wherein the same reference numerals refer to the same or similar elements, an exemplifying embodiment of the present invention comprises a method and system for implementing and coordinating cashless barter between trade parties each having one or more items available for barter, via the communications network, which is preferably the Internet, mobile, or wireless network. Additionally, other embodiments comprise a method and system for enabling efficient browsing and searching within a barter database by means of a remote client, a method and system for finding an optimal match between two and multiple barter offers, and a method and system for arranging shipment of bartered items between two or more parties involved in a trade. A preferred embodiment of the invention relates to the use of the foregoing in conjunction with a computerized classified listing system.

Initially, it is emphasized that the invention is not limited to bartering scenarios between two parties, but can be used for arranging exchanges between multiple parties, i.e., three or more parties. The items bartered may represent virtually anything including a wide range of collectibles, tangible goods, services, rights of use and real estate. The invention also assumes that in a preferred embodiment, two-party and multiparty barter is supported between non-like (dissimilar) items or items from different categories. In general, the present invention can be applied any time one or more items are exchanged.

FIG. 1 shows a general architecture of the invention represented by a central server 100, N trader terminals 130A, 130B, . . . , 130N connected to the central server 100 through one or more networks or the Internet 110 and one or more network interfaces 109. It also shows a mail facility 150 whose function is to enable items to be shipped between traders. Mail facility 150 can be, for example, U.S. Postal Service, UPS, and FedEx shipping companies, or any other type of item handling facility.

The general architecture is shown in FIG. 1 for illustration of how an embodiment of the present invention can be realized and deployed. In a preferred embodiment, the invention is implemented as a Web server thus taking advantage of the global Internet's access spanning across the world. Traders are able to communicate via their terminals 130A, 130B, . . . , 130N with the server 100 by means of Web browsers that display HTML web pages 107 delivered from the Web server 100 by, for example, HTTP protocol. The web site design and implementation can vary widely, however it is assumed that the website provides, at a minimum, web pages for users to be registered, sign in or log in, for adding items to be offered for barter with accompanying trading information to a barter database, and web pages for browsing, searching and patching the barter database. The website shall be able to display, among other things, detailed information about items in the barter database, information about traders, status about their account, their address, and shipping address, information about availability of items for exchange and results of the system's online and offline auto-matching algorithm suggesting potential trades between users (described below).

Processor 103 can be programmed to maintain a database of registered users. Benefits for users to register to use the system include the ability to create any trade offers in any of the ways described below. Non-registered users may still be provided with the ability to use the system, i.e., unrestricted browsing and searching for items, but, in one embodiment, they will not be able to search for potential trades using automated matching algorithms, or create trade offers. Registration may be for free or for payment or other consideration. Also, use of a security feature to ensure each trader's actions, such as use of a password, is envisioned.

Server 100 employs one or more databases 105 containing (i) barter listings, (ii) barter offers and (iii) a barter archive containing all previously posted, but not longer active barter listings and offers. A barter listing or link is created by a trader and contains one or more descriptions of items offered for trade and one or more items the trader is willing to accept in trade. The more items the trader lists that they are willing to accept in trade, the more likely a trade will be completed. In particular, the barter listing is created by a plurality of parties at a client system or their terminals 130A, 130B, . . . , 130N, received by the server 100, and posted to the barter database 105. In one embodiment, a barter listing is formulated by designating a selected quantity of the Item A to be offered, designating a "suggested value" of the Item A to be offered, designating a selected quantity of the plurality of items B to be acquired, trader's shipping information for the items to be acquired, and the trader's payment information. In a preferred embodiment, for each Item A offered, there will be designation of a plurality of items or categories of Items B to be acquired. Designation of a plurality of items to be acquired serves to increase the probability of a successful barter match. Preferably, there will be a plurality of barter listings entered by each trader.

In a preferred embodiment, all items are described in tree-like fashion, where each branch represents categories and subcategories and leaves represent actual items. Each item is designated by a root category, for example collectibles, goods, services, right to use, and real estate. In addition to assigning the item to an appropriate category or subcategory, the item can be further described by a set of applicable attributes that are associated with that particular category or subcategory. For example, the item may be described by attributes named "condition" or "color." In one embodiment, some attributes, such as "title," may apply to more than one or all categories or subcategories.

Figure 2:
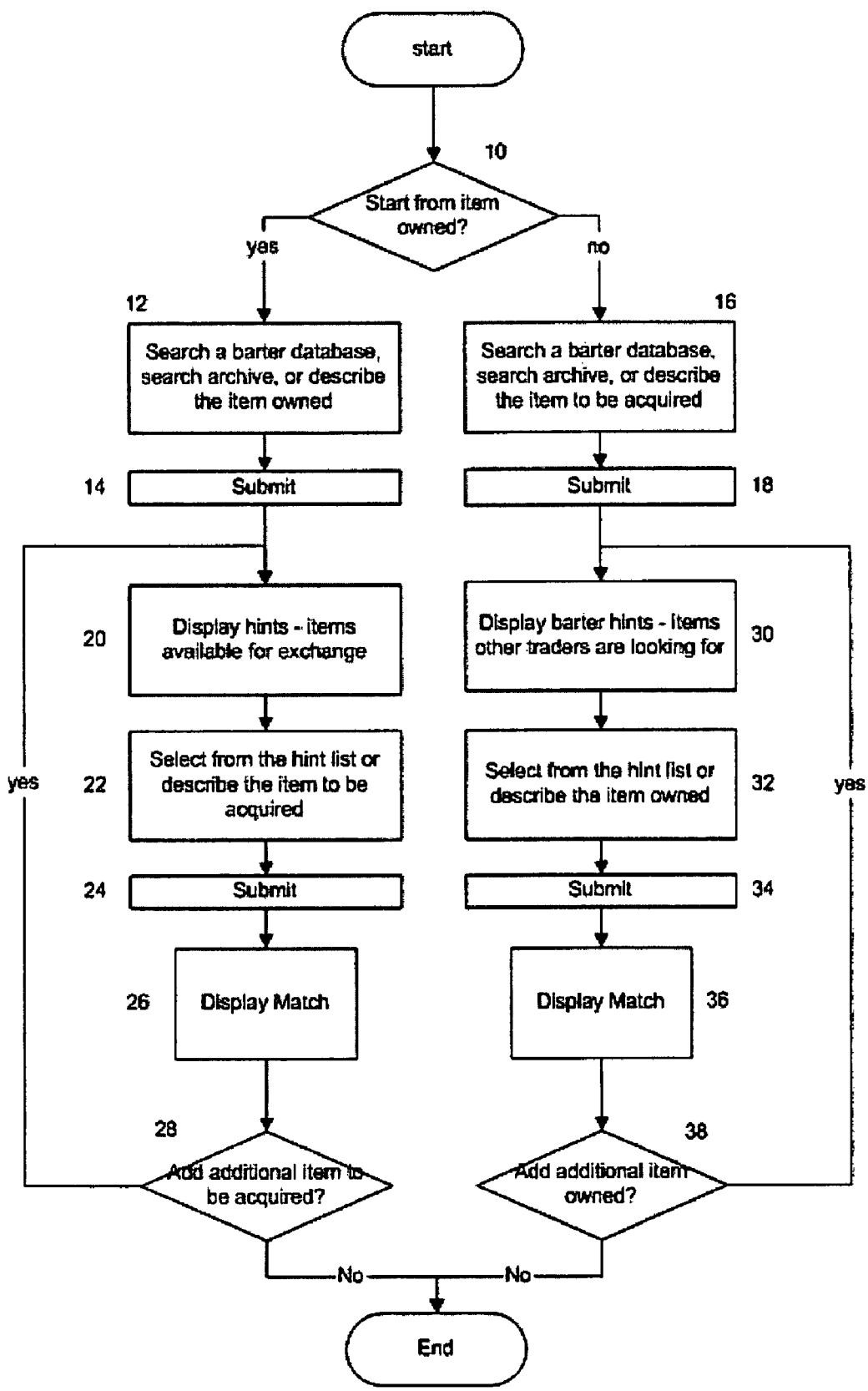
FIG. 2 shows a block diagram of a routine for listing of barter using hints in accordance with the invention.

FIG. 2 shows a flow chart of one way to list an item for trade applying the system and method in accordance with the invention using "hints." A trader may list the item for barter in several ways depending on whether he owns an item to trade or not, 10. If the trader owns an item sought to be traded, he can provide a description of the item 12 via his terminal to be submitted 14 to the barter database 105 maintained on the server 100. If the trader already has some active listings, he can modify a listing to add additional items he is willing to acquire or has. Listings can also be created when the trader finds some interesting item while he is searching or browsing the barter or archive database, 16. In this case, he selects the item from the database to create a barter offer directly from a barter listing.

In addition, barter listings can be created from a "watch list," which contains items that the trader wants to keep an eye on. A watch list contains items saved during browsing the barter web site. Thus, the trader can search the barter database, the archive database or describe an item he seeks 16 and submit it 18 to the server 100.

In addition to creating listings by describing the items manually as described above, it may be possible to describe one of the items "by example" from the archive database. Barter "listing by example" is created in the same way as a standard "barter listing" except that the item the trader is willing to accept is selected from the archive database. The item the trader is willing to accept may be selected using a browse/search function of the archive database of items that were previously posted to the barter database. Barter listings by example are placed by a trader by selecting the quantity of items to be acquired and designating a quantity of items to be offered.

Barter listings by example play an important role in identifying a match rank. The match rank is computed for each potential one-way trade based on "likeness" of an item offered for trade and "likenesses" of items sought. However, when a trade offer is created as a "barter listing by example," the trade is already, a priori, confirmed by the trader and has therefore a high "likeness" rank. In this case, when this item becomes available, the barter listing becomes automatically a barter offer that is sent to both traders for acceptance.

Each barter listing has to include one or more "haves" and may include "wants." A trader can select what he wants in several ways. In addition to specifying one or more detailed descriptions of items he wants, he can specify one or more categories and/or subcategories. Another way to select what he wants is to select multiple items from items he already has on his "watch" list, i.e., from the "watch list," a trader may directly create new "wants." A trader must specify what he has for his "wants" by specifying one or more detailed descriptions of items he own. He can select multiple items from items he already has on his "haves" list.

Hints can also be used to complete listing. "Hints" are listings that match the item the trader is currently listing under "haves" or "wants." For example, when the trader lists the item he owns, the system may suggest items from the barter database that may be accepted by the trader to match his item 20. In other words, "hints" help the trader to create listings that have a high probability of a successful trade.

The trader can select an item from the "hint" list or describe the item he seeks to acquire 22 and submit this 24 to the server 100. The server 100 is programmed to display any potential trade matches to the trader 26, i.e., to the trader's terminal 130. An inquiry is made as to whether the trader wants to acquire an additional item at 28 and if there is, the process returns to the display of hints and items available for exchange 20. If not, the process ends.

The same procedure applies when the trader is seeking an item. Thus, "hints" are displayed along with items other traders are looking for at 30, and the trader can select from the hint list or describe the item owned at 32 and submit this 34 to the server 100. The server 100 is programmed to display any potential trade matches 36 to the trader's terminal. An inquiry is made as to whether the trader wants to acquire an additional item at 38 and if there is, the process returns to the display of hints and items other traders are seeking 30. If not, the process ends.

There are unlimited ways to present a web page used for listing real estate for barter, or other items for trade. Special attributes may be used to further describe a trade or trader's willingness to trade. For example, the trader may determine whether they are willing to accept items of "SIMILAR_VALUE" or "ANY_VALUE." If the trader selects a "SIMILAR_VALUE," only offers that are at the same "suggested value" category will be considered and the trader will not receive any trade offers that are not in the similar category. On the other side, when "ANY_VALUE" is selected, the trader will accept offers from all "suggested value" categories.

The trader may also specify a "MAKE_AN_OFFER" attribute. In this case, the trader may also consider offers that do not explicitly match items he listed he is willing to accept. In other words, he is willing to trade and accept offers from any category. Without explicitly selecting the MAKE_AN_OFFER, trade offers that do not match his "wants" will not be delivered. In addition, the trader can opt out from participating in a multi-trade transaction for this specific item by selecting "TWO_PARTY_ONLY". By default, the trade will be submitted for both two-party as well as multi-party barter.

In one embodiment, the "MAKE_AN_OFFER" and "ANY_VALUE" listing options may be considered default options. However, this is not required and an embodiment of a barter system may be arranged without any default setting or with another default setting or settings.

Another trade attribute describes the trade type the trader is willing to use. Three types are possible: TRADE, BEST_OFFER, POT_LUCK. Variants of the TRADE option are "EXPRESS_TRADE" and "FIRST_MATCH." The trader selects TRADE only when he wants to barter items that he lists as he owns or wishes to acquire. By default, items that match a sub-category or category of the item may also be offered for barter as a substitution if specific items are not available. In that case, the trader will receive those barter offers.

When a trade listing is entered into the barter database, the system matches (i.e., finds potential trades) just entered listing with other listings in the database and suggests "trade offers." This way, a trader will have an option to send trade offers right after he/she lists an item.

If the trader does not want to send a trade offer at this time, he can go directly to browse, search or match web pages to search manually for matches of his items with items others are looking for or have. The match web page will show results of an intelligent matching algorithm. The trader can send trade offers from "browse," "search," "match," and "watch list" web pages created for the barter system in accordance with the invention. If trade offer does not match one of the items on the trader's want list, the system may not notify the trader if he is not interested in offers not matching his wants (e.g., if he did not select MAKE_AN_OFFER while selecting TRADE).

Unless the trader limits trading to two-party only ("TWO_PARTY_ONLY"), each time the user sends a trade offer, the system creates a virtual one-way link between two items indicating that he wants somebody's item. This link will be permanent until any of the two items are de-listed. This invention is instrumental in providing efficient two-party and multi-party matching. In essence, this link indicates a high probability of a barter trade (because the trader manually selected the actual trade). In addition, each time the user sends a trade offer, a new "want" item will be appended to his list of "want" items that he is interested in trading for that specific item he owns. This way, the "want" list grows as the user sends more trade offers. In addition, if a new "have" item was described as part of the trade offer, a new barter listing will be automatically created. The barter listing will comprise this newly created "have" and the new "want" item.

This is important feature to support multi-party trades in that each time a trader sends a trade offer, by default, they have identified an item or items that they want. As links will be assigned a weight coefficient expressing similarity of descriptions or likelihood of match, those created by sending offers will have, in general, higher value than those computed using natural language processing (NLP) algorithms. It is therefore possible to create a plurality of weighted "virtual links" between descriptions of "haves" and "wants." Links between items member want and items other have the form of a connected graph that available matching engines can use to compute "trading circles," e.g., possible or potential barter trades, which are discussed more fully below. Basically though, using links between items, a barter system's match subsystem in accordance with the invention can form a circle of traders and their items to be traded so that one trader may obtain an item from another trader with that trader obtaining an item from yet another trader, and so on, until all traders can be provided with what they seek in exchange for what they are willing to offer. All members in those "trading circles" will be notified by the match subsystem and invited to trade.

The match subsystem may be a computer program resident in the server 100 and run by the processor 103. It analyzes the links created by NLP algorithm and by the parties to determine the presence of potential barter trades involving, three or more parties in the case of a multi-party trade or "trading circle." In one embodiment, in addition to enabling creation of links between only two items, an item available for trade and an item sought to be acquired, it is also possible to create a link between a single item a trader has available and a plurality of items a trader seeks (for example a group of similar items), between a single item a trader seeks and a plurality of items a trader has available, between one of a plurality of items a trader has available and a single or one of a plurality of items a trader seeks or between one of a plurality of items a trader seeks and a single or one of a plurality of items a trader has available. Each link will be permanent until items are de-listed which would prevent the link from having an item available for trade and an item sought to be acquired.

For both two-party and multi-party trades, a barter offer can be created by a trader in response to a barter listing. A barter offer is sent to the other trader. A barter offer can be created in various ways. For example, a barter offer may be created manually by a trader, or it can be created from a list of items displayed while matching a trader's "have" or "want," searching or browsing. When barter offers are accepted by all participating traders, trade closes.

In one embodiment, barter offers are entered into the database conditionally upon entering a valid user identification (e.g., ID) and password. In yet another embodiment, a condition for obtaining a user ID and password will be payment of membership fees. In yet another embodiment, no user ID and no password is required to post a barter offer to a barter database. Registered traders who post their items for trade to the barter database may additionally use advanced search methods whereby a trader may search for other traders who are looking for items he is offering for trade or search for other traders who have items he is looking for.

In the latter case, processor 100 would check a database of users of the system to determine whether a user seeking to use advanced search methods is registered. If not, the user is prevented from using the advanced search and match features. This thus creates an inducement for users to register with the system.

Once populated by a plurality of barter listings, the databases are available for searching or browsing by traders from their client systems or terminals. Traders may browse or search, using keywords, an inventory of items for trade or items the traders wish to acquire. The trader can initiate browsing by selecting an HTML link at the home web page and use navigation features between various categories to browse through contents of the barter database. Similarly, the trader may initiate a search using a keyword search from a web site. In addition, the trader may use a special type of search using a "matching engine," described below. From a resulting list of items presented to the trader at the client system or terminal, the trader then selects one or more items to view details about the items or to compare the items. Using any of the search or browse methods, each trader may identify items from the barter database that he wishes to obtain and that match his items for trade. Similarly, each trader may identify items that others are looking for as items that he has and is willing to provide in the course of the trade.

In one embodiment, the server system uses a barter matching engine to match individual barter listings and barter offers between pluralities of parties in such a way that two and multi-party trade circles can be identified. Retrieval of matched listings and items is triggered by a request from the client system using a "match" method for one of his "haves" or wants."

Additionally, when a new barter listing is entered to the barter database, the server system can be arranged to display a few potential listings that match the listing just created. This way, the trader has an opportunity to create a barter offer and initiate a trade right after submission of the listing simply by selecting one of the matched listings. If the trader does not like to send a barter offer for one of the displayed items, he can continue to see all matches by selecting a "match" link.

Before listing the item, the trader selects one of the barter options according to which he want to trade. There include: standard "TRADE" (with three-way handshaking), with variants "express trade" offer and "first match" listing; "BEST_OFFER" and "POT_LUCK."

Figure 3:
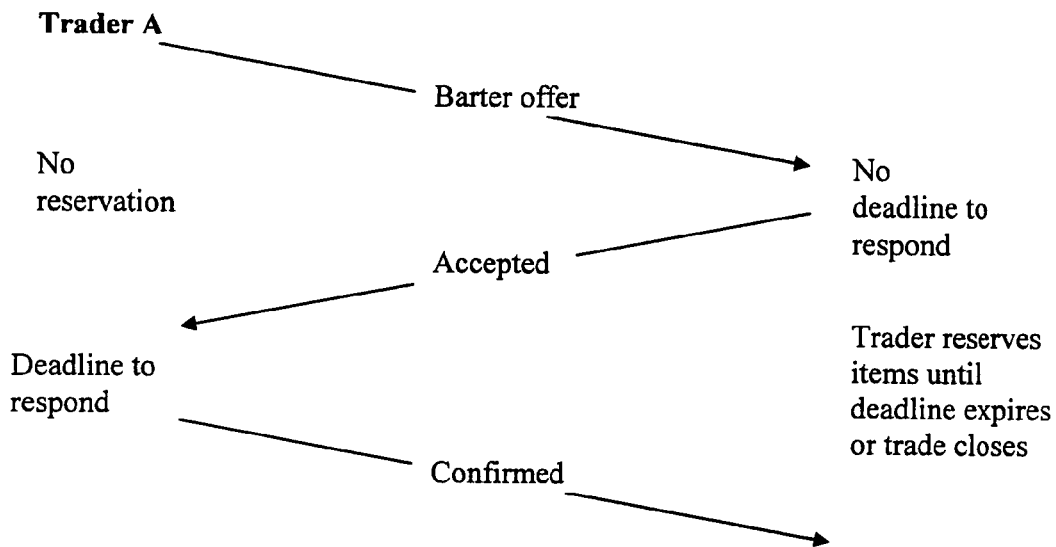
FIG. 3 shows a flow diagram of a two-party trade formed in accordance with the invention

FIG. 3 shows a "TRADE" with three-way handshaking between two traders as an efficient way to close a barter transaction. For simplicity, assume that a trader A finds an item he wants to acquire (such as by using the browsing feature) and decides to send a barter offer to trader B. As defined earlier, the barter offer is a response to a published barter listing. For example, when a trader A finds an item that he is willing to acquire, to create a barter offer, trader A must select that particular barter listing from a barter database and associate it with description of an item that trader B is looking for.

That description can be selected from a list of items trader A owns, i.e., from a pre-existing list of "Haves," or trader A must create a new description. Then, a trader A sends a barter offer to trader B. In one embodiment, sending of the trade order can be as simple as clicking on the button or link at the bottom of the web page sent by the server in response to selection of an item from the barter database. In another embodiment, "drag and drop" functionality can be used; thus a trade offer can be created simply by dragging an image or description of one item on top of the other. On this web page, the trader describes an item that he owns and that he is willing to trade for trader B's item. Trader B can also receive trade offers from other traders and automatically from the barter system as "suggestions." Each trade offer indicates if it is a two-party or multiparty offer or if the offer closes the bartering circle. Each trade offer may be sent to the trader by email or by other means, for example by SMS.

When trader B receives a trade offer, he can decide to accept the trade offer or not. Upon receipt of the trade offer, trader B can manually search for items to create a multiparty trade if he does not want the item trade A is offering to trade.

There does not have to be a deadline to respond to the offer, therefore the offer will stay active as long as that barter listing does not result in a completed transaction and both items are still available for trade. The status of all sent or received trade offers may be indicated in each trader's "My Account" web pages. In one embodiment, traders are in full control of their decision to barter and under no obligation to accept any offer, initiate other two-party trades, or finalize trades out of any trading circle that was formed.

Since trader A can, in general, send multiple barter offers to multiple traders, a response from one of them needs to be confirmed to close the trade. In other words, two-party barter offer acceptance by trader B needs to be re-confirmed by trader A initiating the trade (e.g., by way of three-way handshaking). This allows traders to send multiple barter offers for an item they own and wait to see if any of them are accepted. When multiple barter offers are accepted, the trader may then select the one he likes the best and confirm the trade.

If trader B is not interested in a trade, he does nothing. If trader B is interested in a trade, he will send a trade Accept message, optionally called "RESERVE," back to the trader A. By accepting the barter offer, trader B agrees to hold the item for some pre-determined time until the transaction is closed, rejected, or expired. Trader B will send the Accept message and generate the RESERVE request only when he or she is sure that they want to complete the trade. The RESERVE request can be used to specify that trader B is reserving one item for an item that trader A has, a plurality of items for a single item that trader A has, or a plurality of items for a plurality of items that trader A has.

On each trader account's web page, those items participating in the trade will be indicated as "pending." In TRADE, by sending the RESERVE, traders agree to reserve their item for some maximum, pre-determined time, for example, forty-eight hours. In a two-party trade for example, when trader B accepts the offer, trader A has to respond within a predetermined time by confirming the trade in order for the trade to be closed successfully. In multi-party trade, the potential barter trade, which may be derived from a plurality of links determined to create a "trading circle," is confirmed when all traders participating in the trade reply by a trade Accept message (the RESERVE). A predetermined time limit, such as forty-eight hours, is preferably set within which each trader must reply by an Accept message in order to complete the barter trade.

Trader B must reserve their item or items for that timeframe until trader A confirms or rejects the trade offer. Trader B cannot cancel the RESERVE request. Thus, trader B can send only a single RESERVE request for each item available to him to trade. In a multi-party trade, each party would have to reserve their item until a predetermined time limit that started with the first party accepting the multi-party trade expires. Within that timeframe, either a trade goes through or all items in the trade will be released. Barter offers that do not close within this timeframe are automatically de-activated.

When trader A confirms the trade, the computer program may send a Confirm message to trader B. Once this Confirm message is sent to trader B, the trade is binding on traders A and B and constitutes completion of the trade (pending actual exchange of the items). If trader A does not want to trade, the computer program can be arranged to enable trader A to indicate this in response to the RESERVE request from trader B in which case, a Reject message would be generated and sent to trader B. In multi-party trade, the computer would send a Confirm message to all parties involved in the trade to signify completion of the trade and optionally arrange for shipment of the items as described elsewhere herein.

Another feature in some embodiments of the invention is a PRE-RESERVE feature, which is applicable when a trader wants an item that is currently subject to a RESERVE request generated by another trader. The computer program running the barter system does not permit multiple RESERVE requests for the same item. In addition, it does not permit receiving a RESERVE for the item that is subject to RESERVE (e.g., for the item that is reserved for trade with another item). However, using the PRE-RESERVE feature, the trader can direct that the computer program running the barter system send a new RESERVE request to the trader having the item sought once the pending RESERVE request expires (and the traders involved do not complete the trade for that item). A PRE-RESERVE request may be cancelled by the trader at any time before the RESERVE request is generated.

A trader having an item subject to a RESERVE request is preferably not notified of the existence of a PRE-RESERVE request.

As an alternative to a PRE-RESERVE request, it is envisioned that RESERVE queuing may be applied wherein the barter system will generate a RESERVE request notify a trader who wants an item subject to another RESERVE request. However, the trader is notified that the RESERVE request will not be active until a later time, i.e., once the existing RESERVE request expires or otherwise does not lead to a completed trade. In this manner, it is possible to form a queue of RESERVE requests for a single item, but no two RESERVE requests will be active at the same time.

A trader having an item subject to a RESERVE request is preferably not notified of the existence of a queued, inactive RESERVE request.

In one embodiment, when a trade completes, traders may have to pay a transaction fee. Payment of the transaction fee may be authorized using a credit card, a check on file, or other payment system. In reality, both traders are charged only when the trade is successful, e.g., confirmed by all parties. All traders will be notified by email or SMS if the trade closes. If payment is made by a credit card, the credit card will be processed at that time. If the payment does not go through, all traders may be notified, for example, by email.

Figure 4:
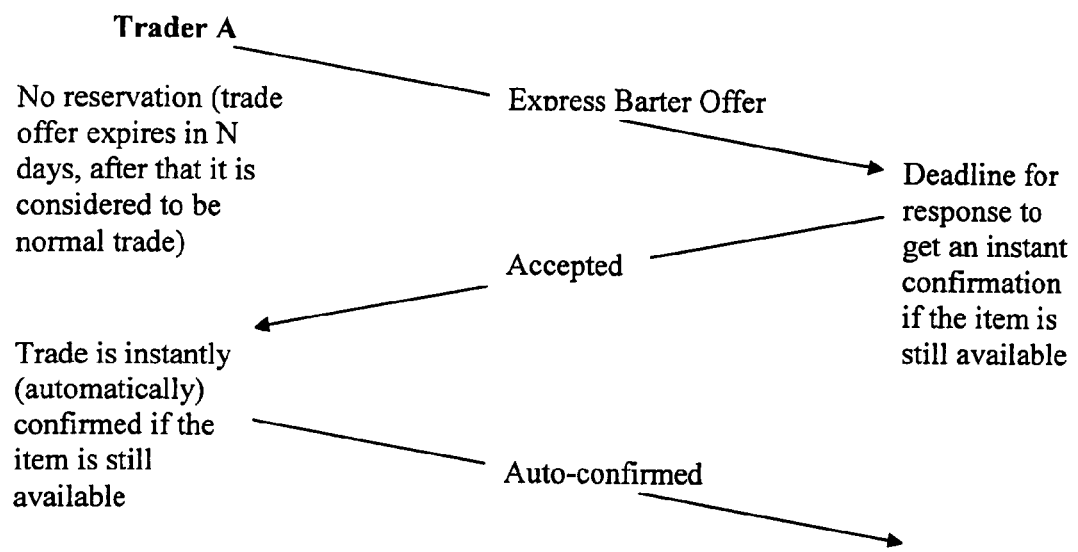
FIG. 4 shows a flow diagram of a trading feature in accordance with the invention.

FIG. 4 shows another embodiment available in the present invention, called "express trade" or "express match" that is based on a two-way handshake, which provides automatic trade confirmation for requested trades. In this case, trader A sends an express trade offer, which indicates his pre-approval of a specific trade, i.e., an indication he agrees to be immediately bound to the specific trade without reservation, so it can be instantly confirmed and closed when the other trader B accepts the trade. This two-way handshake applies to both two-party and multiparty trades. If trader B accepts an express trade offer, the deal is closed instantly without re-confirming the express trader offer from trader A. The trade is closed on a first-come, first-served basis. All other trades may be automatically retracted when the item is no longer available.

Trader B can send multiple trade offers, however only one can complete the transaction successfully on a first-come, first-served basis. It is assumed that if trader A sends an express trade offer, he reserves the item for a pre-determined time (for example, 3 to 7 days) during which he has to keep the item available for trade on the barter system. The system will keep track of availability of the item so trader A can send barter offers also for other listings and complete the trade any time. The barter system also preferably keeps track of completed trades so that the item is not "traded" twice. After the pre-determined period, if the trade is not completed, the two-way trade listing may automatically revert to a standard barter listing requiring a three-way handshaking to complete the trade. Traders can update and extend the barter listing for another pre-determined time period if so desired.

Figure 5:
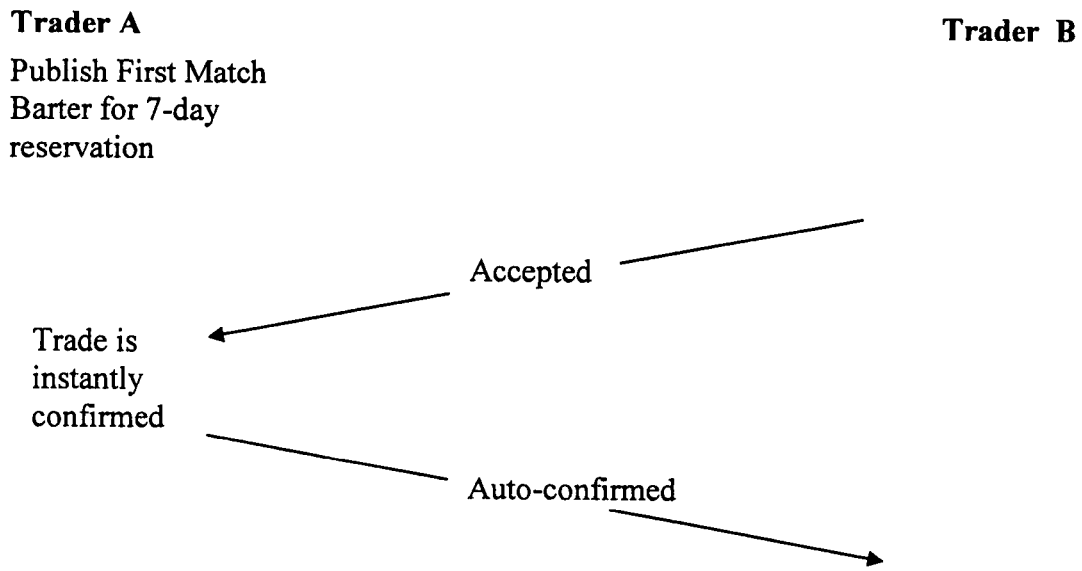
FIG. 5 shows a flow diagram of another trading feature in accordance with the invention.

FIG. 5 shows another embodiment of a manner to perform a barter transaction in accordance with the invention, which is referred to as a "first match" and essentially represents a listing that is closed on first-come, first-served basis. This trade listing is also time limited. For this barter transaction, trader A lists an item for some pre-determined time, e.g., a seven-day reservation period. During this time, trader A can still send trade offers as usual. However, the first trader that satisfies the requirements of the trade, represented by the arrow designated Accepted in FIG. 5, will close a deal without requiring confirmation of the barter offer by trader A, represented by the arrow designated Auto-confirmed in FIG. 5. This trading may be available only for items or services that are exactly specified and clearly described.

In one embodiment, items bartered may include among other things, new items, books, or timeshares with specific location and period. The barter system feedback will generally be used to make sure the traders do not abuse the first match transaction technique.

Figure 6A:
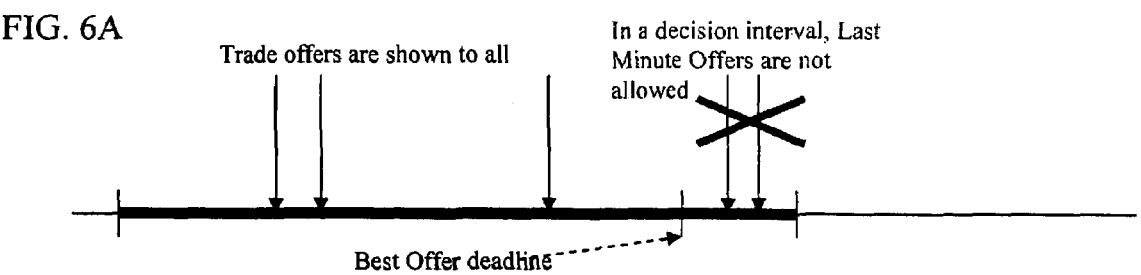
FIGS. 6A, 6B and 6C show diagrams of more trading features in accordance with the invention.

Referring now to FIG. 6A, another embodiment of the invention, implemented as a "best offer" trading feature, is described in the following scenario: trader A wants to trade the item he owns but does not know what he wants, or there is no "want" list for the items they have available to trade. The items listed this way will be available to be traded for some specific time, for example, seven days, during which items cannot be offered for any trade. All barter offers (e.g., responses from other traders) may be posted publicly on the website for traders to see and, at the end of the offer deadline, trader A will have an option to accept one of the offers or reject all of them. The trader may be required to maintain the item listed to be traded for the specific time, e.g., seven days. The trader is also provided with a deadline to select a trade. Offers are not permitted to be submitted after the best offer deadline expires and before the trader is required to select a trade.

Figure 6B:
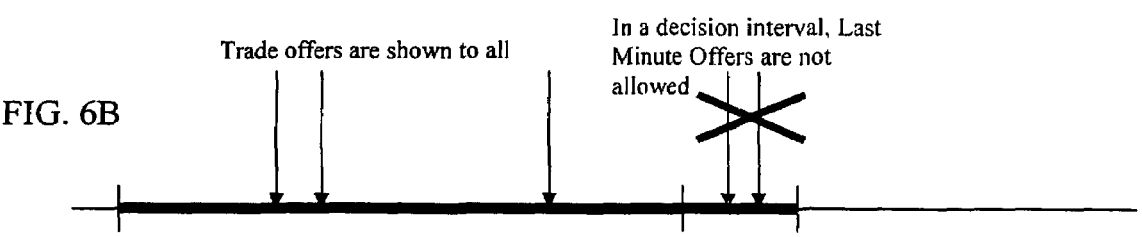
Figure 6C:
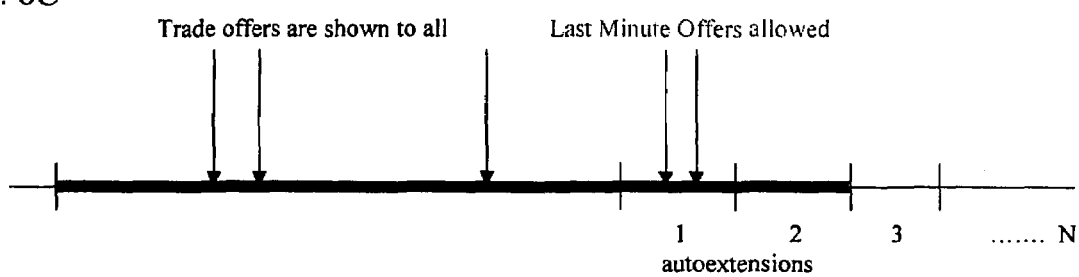

In other embodiments of the invention schematically shown in FIGS. 6B and 6C, the computer program implementing the system provides a trader with two options relating to the "best offer" trading feature. The first is referred to as the "pre-select" option, shown in FIG. 6B, and can be invoked during an initial trading interval. Using this option, the trader can pre-select any offered item for trade before the "best offer" deadline ends. However, this option can be cancelled any time, even during a decision interval between the best offer deadline and the deadline to select a trade or designate any other trade as being pre-selected. This pre-selection will not be shown to others and unless the member cancels the pre-selection feature, the trade will be completed automatically with the last pre-selected item. Items offered will be shown publicly, a trade extension is not permitted and trade offers will not be accepted after the best offer deadline. The pre-select feature may be modified to the autotrade feature, described below, only before the best offer deadline ends.

FIG. 6C shows the autotrade feature which can be invoked during an initial trading interval and simulates an actual auction. The best offer deadline is automatically extended if there are additional offers during the decision interval between the best offer deadline and the deadline for the trader to select a trade to be completed. All items offered during trading interval will be shown publicly. The autotrade feature will not be shown to others until the end of the trading interval. If a new offer does not come in during decision interval, the best offer would automatically be completed.

However, if owner selects another offer from "Last Minute Offers" (those submitted after the best offer deadline) as autotrade, the trade would automatically extend for another decision interval, e.g., twenty-four hours (autoextension) but the maximum extended period may be twice the original trading interval. Other bidders from the previous period would not participate in the autoextension and will be free to trade. As such, only "Last Minute Offers" need to reserve and hold their items until the end next decision interval. Within the decision interval, a trader has an option to select any other incoming offers as the next autotrade. Additional features of autoextension include that if a trader does not select a winner within the extended decision period, the trade is completed automatically with the last autotrade item selected.

A "Last Chance" feature of the invention, which may be implemented on a web site at which the invention is implemented, shows items for which the best offer is expiring shortly. The trader may decide to re-list the item after the expiration of the time period.

In yet another embodiment of the invention, a "pot luck" trading feature is provided wherein a trader may want to list an item he owns, but he does not know what he wants. Items submitted for this scenario are preferably assumed "reserved" for some specific time period, e.g., a thirty day reservation, or until a trader decides to de-list the item. During this time, when the barter system finds a potential trade, a trader will receive a trade confirmation. Confirmed trades in this case are considered final. This trading is preferably closed to the public. Trades are automatically generated by the barter system (the system automatically finds a best match). Preference will be given to comparable items in the same "assumed value" category except for those items pending confirmation or otherwise not available for trade. Items submitted to the barter system using the "pot luck" feature may complete both two-party as well as multiparty trades.

In a "pot luck" trade, there is no need to update the listings. The system will email traders reminding them to update the listing. If the user does not take any action, the item will still be available for normal trade as "MAKE_AN_OFFER" and "ANY_VALUE" trading options—but only after addition of "want" items and manual activation.

A trader having an item I1 and willing to exchange it for item I2 may be matched to a trader having an item I2 and willing to exchange it for item I1. However, limiting the potential trades on swapping between two traders is a strong restriction, and may be eliminated in some embodiments of the invention. In the case of buying/selling using money, the assumption of two-party transactions is valid because it is possible to use money to offset one side deal transaction. However, in cashless bartering, it is not always likely that a match is going to be found. Therefore, in a preferred embodiment, the invention will accommodate multi-party matching between a plurality of items owned by individual traders. In this case, adding more traders and items to the trade can improve the global satisfaction of all traders, because, if independently paired, their trade requirements would not be possible to match satisfactory and probability of a trade not going through would increase.

Figure 7:
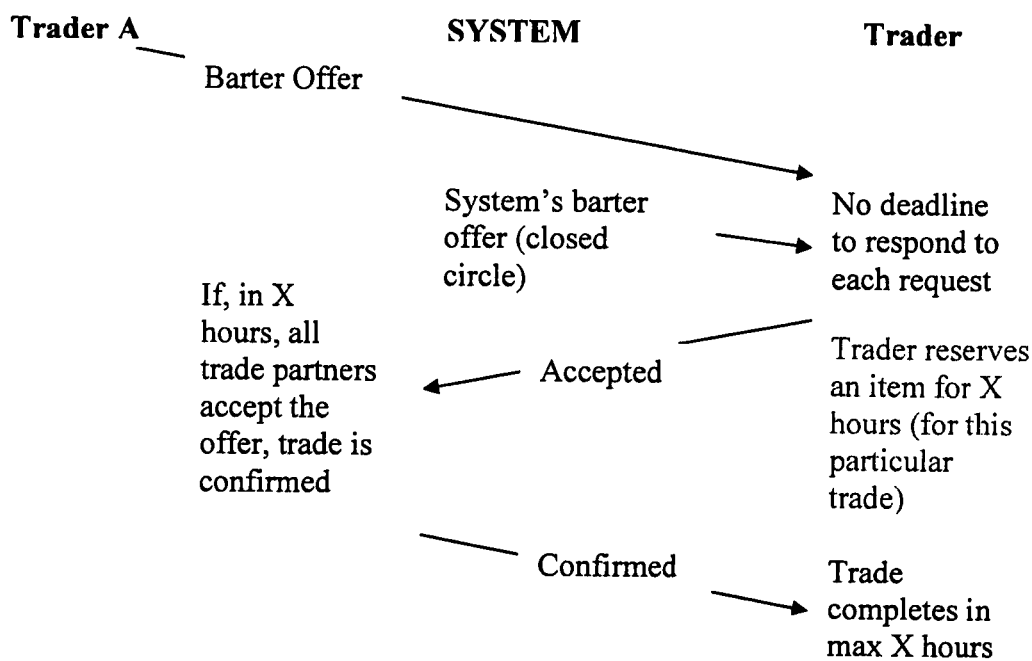
FIG. 7 shows a flow diagram of yet another trading feature in accordance with the invention involving three or more parties.

FIG. 7 shows a multi-party trading feature in accordance with the invention. Multi-party trades are accomplished between three or more traders. To form a trading circle, the server system is actively looking for matches and suggests potential matches to traders. A special, preferred feature of multiparty trade is called a "negotiation period," which starts when a first trader accepts the multi-party trade and ends after some pre-determined deadline. The negotiation period is designated "X hours" in FIG. 7. The multiparty trade circle is formed in two ways: (i) when a trader sends an accept ("RESERVE") request for an item that was identified as a potential multi-party trade on "match" interface or (ii) when the barter engine identifies all parties and one of the traders accepts the trade by sending accept requests. When a circle is formed, all traders of the circle are notified, for example by email. To close the trade, all traders in the circle must accept the trade within this negotiation period by sending a "RESERVE" notice to the server or processor coordinating the trade. By accepting the trade, traders agree to reserve their item for some specific time during which they cannot trade the item. If trade is not completed within that timeframe, the trading circle disintegrates and all traders are free to participate in other circles.

In one embodiment, the multiparty trades are not publicly listed. Only traders of a trading circle have an opportunity to see who the traders of the circle are, what they have, and what they want. During some pre-determined time when traders of the trading circle negotiate, they are able to communicate between each other to complete the trade using, for example, instant message application, email, or other means of communication. Moreover, it is possible to append communications to the listings.

In a preferred embodiment, after the multi-trade trading circle is closed, all traders will have access to the trading circle's chat forum. This chat forum is similar to interactive forum or web-based instant messenger allowing traders to chat online to re-negotiate deals and finalize offers. The chat forum will show all items involved in the barter group (circle) and how they are linked together with other items. Traders will be able to exchange messages with other traders of the circle in order to negotiate the deal between each other in case one of the circle's traders does not like to be part of the deal. This chat will be active during the time allowed for confirmation of trades. Traders can be a part of two and more chats.

To provide features described above, a barter engine is formed which is a program that executes on a server system. The barter engine preferably executes in real time (although batch execution is also a possibility) and searches for single or multi-party matches to identify completed (circular) or uncompleted (open) potential trades between items offered and items to be acquired. Match connections (e.g., links) between two items are formed and each connection is assigned a weight according to the likeness of the match. When an exact match is not found, the barter engine tries to match sub-categories and categories, even though the likeness of a match in this case decreases. A trading circle is formed as a shortest one-way route originating at one node and ending at the same node. Loops may consist of more than two items, for example in three-way match, three traders are involved. Those knowledgeable in the art will find standard search algorithms accomplishing this task. The shortest route with the highest "cumulative or aggregate similarity" represents a best match.

The barter engine takes into account risk associated with the probability of a successful match between multiple trade parties. If a multi-party circle is formed consisting of multiple traders, it is assumed that a trading circle with lower number of parties will have a higher probability to be completed.

In bath mode, when a barter engine identifies a trading circle satisfying a predefined "likeness" threshold condition, i.e., having a similarity measure above a predetermined threshold, the barter server sends a message to all participating traders including a trade identifier associated with the trading circle. When each client receives the message, the client can display the message if it is in the form of an HTML document identifying the complete trade or the client can request that document by clicking a link within a message if the message is an email. In one embodiment, it may be necessary to login in to the barter server to view the complete trading circle. Traders have an option to accept the trade at the client system by selecting an "Accept" button (link) that sends an Accept message to the server system. If, within the known default time period, the server system receives confirmations from all involved traders, it combines trades with each other's identification, payment, and shipping information to generate an order to complete trades between multiple parties in accordance with billing and shipment information whereby each trader effects the trade completion by selection an "Accept" trade button. All involved parties will then be notified by the barter engine sending a "Confirm" message with details how to arrange for shipment of the items.

Traders of multi-barter circles agree to accept the items once the trading circle is closed. No return is allowed. Traders can use a feedback mechanism to rate other traders.

The foregoing multi-party bartering features may be implemented by a computer program resident on a computer or server connected to the communications network or Internet. The computer program would be arranged to present various web pages with options to the users and provide the users with the capabilities described above to enable the formation of trading circles over the Internet, and actualization of multi-party trades.

Specifically, the computer program would be capable of maintaining a list of descriptions of items available for trade in a current database, enabling parties to access the current database to browse and search the descriptions using a communications network, enable each party to create links between two or more items, at least one which has a description in the current database, indicating a desire to trade at least one available item of the link for at least one sought item of the link, and analyze the created links to determine the presence of potential barter trades. Each potential barter trade in multi-party trade would involve a plurality of links wherein each party involved in the potential barter trade provides an available item included in one of the links and receives a sought item included in one of the links, although not necessarily the same link. Thereafter, the computer program notifies each party involved in the potential barter trade of the possibility of actualizing the barter trade and enables the notified parties to confirm or reject the barter trade. If a multi-party trade is confirmed, the computer program can proceed to implement the secure shipment feature described herein.

To facilitate the creation of descriptions, the computer program can maintain a list of descriptions of items previously traded or offered for trade in an archive database and enable each party to create descriptions of available items and sought items for inclusion in the current database using a search or query of at least one of the current database and the archive database.

To facilitate the creation of links, the computer program may be arranged to determine a similarity measure between available and sought items included in links and consider a potential barter trade to be present when the similarity measure is above a threshold. In one embodiment, similarity measure may be computed using natural language algorithms. In this case, descriptions of items in different languages must be translated to single language to aid computation of similarity measure. The similarity measure may be determined by the computer program on-line or when the parties are off-line, i.e., not using the communications network, and the computer program arranged to notify the parties once they log-in to the system.

Regardless of how a barter trade is arranged, it is necessary to complete the actual barter by shipping the items subject to the trade from one trader to another. Therefore, the invention also provides a secure shipment technique to traders to coordinate and schedule the shipment of the items subject to trades. This shipment option may be implemented on the barter server and requires a trader to login.

Upon login, each trader may print mailing labels and arrange for shipping once all traders to a transaction have agreed to transfer the items, e.g., once "Confirm" messages have been sent to the traders involved in the transaction. An order for a pick-up of each item involved in the transaction will be issued by the barter system to a mail facility (150, FIG. 1) only after all trade participants arrange for a shipment. Instead of a single mail facility 150, there may be any type of item handling facility or multiple item handling facilities, in which case, they would also be linked to the barter system, server 100, through the Internet 110.

In one embodiment, when traders use a secure shipment or exchange, their items will not be picked-up or delivered until the other trader sends his item and vice versa. At a minimum, in a secure shipment in accordance with the invention, an item will not be delivered to any party involved in the transaction until another item, e.g., an item to be provided by that party, has been picked-up. Thus, in a two-party barter transaction, one party will not receive their requested item until their item being traded has been picked-up. Once picked-up, the barter system may be arranged to prevent the item from being returned to the providing party.

Moreover, it is possible that an item will not even be picked-up from a party involved in the transaction until another item to be delivered to that party has been picked-up. Thus, in a two-party transaction, neither party will receive their item until their item has been picked-up and is in transit to the other party.

In another embodiment, arrangement of the shipment will be controlled directly by the mail facility 150, or other item handling facility. In this case, items will be picked up immediately after arrangement of the shipment; however, they will not be delivered until all traders' items are picked up.

Delivery of all items involved in the transaction may be made to the mail facility 150 or other item handling facility or facilities. Barter system may control the mail facility 150 to coordinate delivery of the items from the mail facility 150 only after they have all been received at the mail facility 150, or are in transit to the mail facility 150.

The foregoing trading features may be implemented by a computer program resident on a computer or server connected to the communications network or Internet. The computer program would be arranged to present various web pages with options to the users and provide the users with the capabilities described above to barter items over the Internet.

Specifically, the computer program would be capable of generated a web page which allows users to browse an inventory for items available submitted by others, i.e., the inventory being maintained in database 105 (see FIG. 1), and browse and modify a list of items they want. Browsing may be enabled using keywords or other known searching techniques. The computer program would also be arranged to present a web page, which enables the user to post an item for trade using any of the features described above. After posting an item for trade, the computer program enables the user to search through the database 105 in order to find a suitable trade manually using matching options such as searching what other users have, searching what other users want, searching by a "Have" list which means that the user looks to see what he can get for his item(s), searching a "Want" list which means that the user looks to see whet he needs to have to get what he wants, "Smart Pick" which is described below, "Active Match" which enables identification of a match between what the user has and wants whether involving only one additional user or two or more additional users.

The Active Match interface will allow users (preferably using a simple one click) to ascertain what they can get for what they have or what they need to get in order to be able to get what they want, match items in real time for possible barter exchange and generate trade requests to initiate trades. The computer program will implement this Active Match feature as an intelligent matching search engine, which is capable of distinguishing between searches for items having similar but slightly different names, such as "parada boots" and "prada handbag". However, if no items are found with the exact match for a searched term or phrase, the computer program may suggest to the user either to broaden the search or offer "smart picks" from a broad category or less broad sub-category.

The computer program is also arranged to enable the user to post an item in one of the various ways described above, e.g., "TRADE", "BEST-OFFER", "POT_LUCK", EXPRESS_MATCH" and "FIRST_MATCH", and to determine the value, i.e., "ANY_VALUE" or "SIMILAR_VALUE" in the case of an item on the "Haves" list. The computer program may also be arranged to present advanced options to the trader, such as a possibility to have the items they trade for delivered by the post office in a guaranteed manner, a possibility to participate in a chat service to resolve and close trades, a possibility to converse with other traders such as using mobile telephones, and a possibility to initiate telephonic communications to discuss trades.

Guaranteed delivery, or a secure shipment, may be achieved by delaying delivery of an item being traded by a trader until the item he is trading for is sent by the providing party, or otherwise in control of a third party without the possibility of the providing party halting the delivery of the item. The chat service may be similar to an instant messaging system where people can trade while online and essentially complete trades within minutes while they are browsing online.

The "Smart Pick" option described above is implemented by the computer program to suggest one or more close matches based on a user's past behavior, feedback, his wants, and haves. The computer program will apply one or more algorithms as a default sorting mechanism for ActiveMatch. This option can also be used at the item detail page so that immediately after a user adds a new item, an item detail page will show a number of smart picks the system selected as possible trades. A trader can send a trade offer to one or all suggested trades in one click or use the "drag and drop" feature described above. Alternatively, he can select which one he wants to send an acceptance. If the user does not want to send any trade offer now, he can later do so from the Active Match feature.

Figure 8:
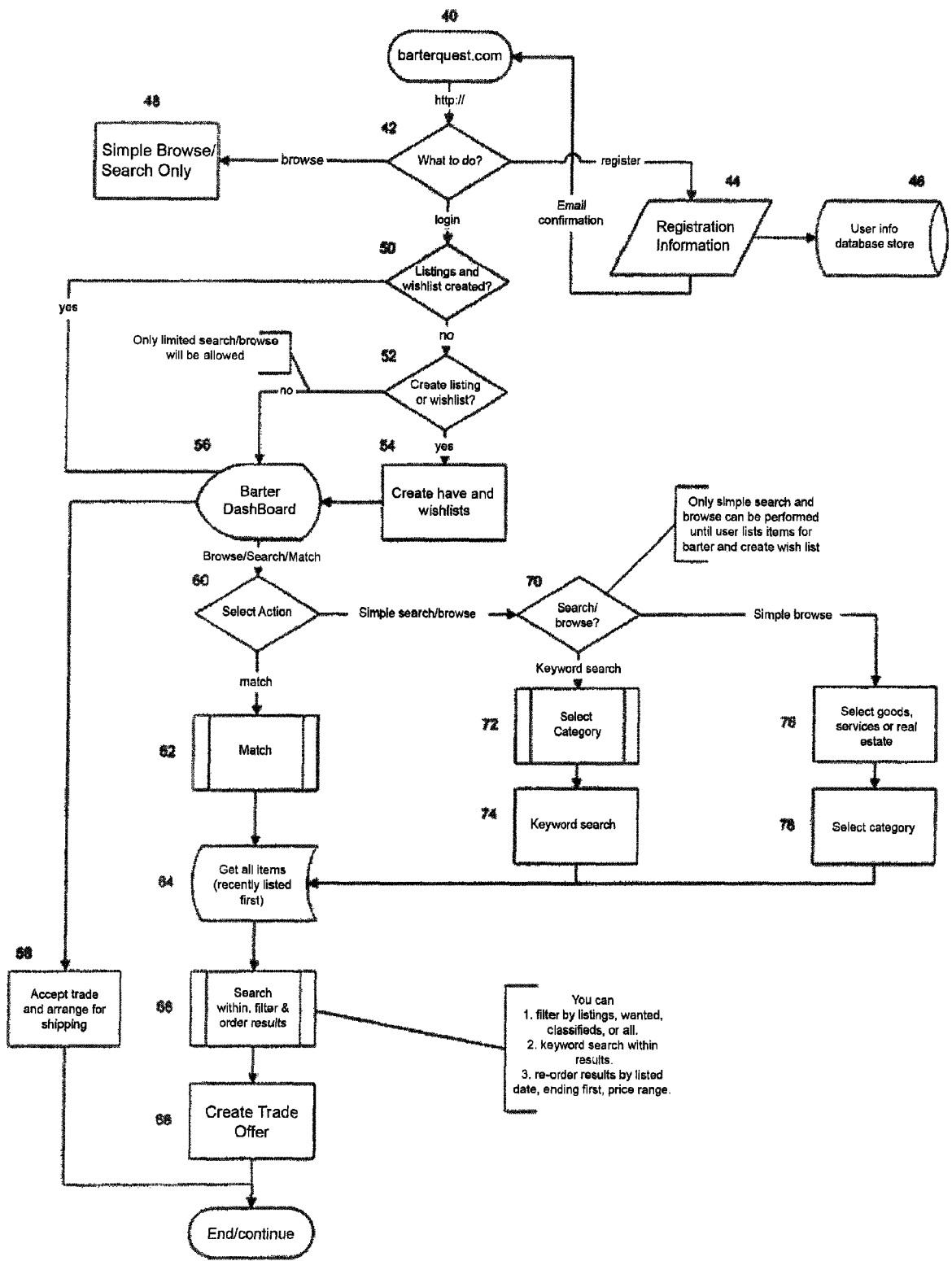
FIG. 8 is a workflow diagram of a bartering system in accordance with the invention.

Referring now to FIG. 8, the process for using a computer program via a terminal connected via the Internet to a server on which the computer program is running first requires the user to access the website 40. The user is presented with a web page of options including to register, login or browse 42.

If the user decides to register, he is prompted for registration information 44, and the user information is stored in a database, 46. An email confirmation is sent to the user to enable them to subsequently login at the website.

If the user decides to browse, he is enabled to conduct a basic browse and search only of the database containing items available for trade 48.

If the user logs in, a query is made as to whether the user created listings and a wish or want list 50. If not, a query is made as to whether the user wants to create listings and a wish or want list 52 and if so, the user is provided with web pages to enable him to create a "haves" list or listings and a "wants" list 54. Once the user has created listings, the user is provided with access to the barter database 56. There may be an indication of a possibility of completing a trade (originated or structured in any of the ways described above) and the user can accept the trade and proceed to arrange for shipping of the items being traded 58. At any time after successful login, the user may create additional listings 54.

Otherwise, the user is presented with options for browsing, searching and matching items (in any of the ways described above) and selects an action to be performed 60. If the user matches items 62, he receives a list of matching items 64 and is provided with the ability to search within, filter and order the matching results 66. More specifically, the user can filter by listings, wanted items, classifieds or combinations thereof, perform a keyword search within the results, and reorder the results by listed date, price range, distance from a trader's location, and other parameters. The user can create a trade offer 68 and then complete the trade.

If the user wants to search or browse, they can indicate this 70 and to search, be provided with categories of which one is to be selected 72, and then the ability to conduct a keyword search 74. To browse, the user is provided with the ability to select goods, services or real estate of which one is to be selected 76 and then the ability to select a category thereof 78. The process then proceeds to 64 where the user receives a list of the items. Whenever the user is presented with categories, they may also be presented with sub-categories in various stages with each more narrow than the preceding ones.

The foregoing secure shipment features may also be implemented by a computer program resident on a computer or server connected to the communications network or Internet, and in some cases, connected to the mail facility 150, or other item handling facility or facilities. The computer program would be arranged to present various web pages with options to the users and provide the users with the capabilities described above to enable secure shipment of items subject to a confirmed transaction over the Internet.

Accordingly, the computer program would generate orders for pick-up of items from each party only after all parties to the transaction have arranged for shipment of the items involved in the transaction and coordinate secure shipment of the items by scheduling delivery of any item to any party only after at least one other item involved in the transaction has been picked-up. Coordination of the transfer of the items may entail refraining from authorizing pick-up of an item from one party to the transaction until at least one other item to be delivered to that party is determined to have been picked-up.

The computer program can direct delivery of all items involved in the transaction to at least one item handling facility, monitor receipt of items involved in the transaction at the item handling facility or facilities and direct delivery of the items to the receiving parties only after all items involved in the transaction have been picked-up from the providing parties and are in transit to an item handling facility or have actually been received by an item handling facility.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method for conducting barter transactions between parties, comprising:
   receiving one or more barter listings each including one or more items sought to be traded and one or more descriptions of one or more items sought to be acquired;
   searching, using a computer processor, for at least one first item from the one or more barter listings;
   creating a barter offer including a request to exchange the at least one first item from the first party for at least one second item from a second party;
   generating a first reserve request for the at least one second item and preventing the second party from both entering into other barter offers and from cancelling the first reserve request until the first party confirms or rejects the first reserve request or a first predetermined period of time expires;
   generating a second reserve request to exchange the at least one second item in for at least one third item, wherein the second reserve request is generated for a third party and queued behind the first reserve request;
   if the first party confirms the first reserve request, notifying the second party of the completion of the barter offer; and
   if the first party rejects the first reserve request or the first predetermined period of time expires, notifying the second party of second reserve request and preventing the third party from both entering into other barter offers and from cancelling the second reserve request until the second party confirms or rejects the second reserve request or a second predetermined period of time expires.

2. The method of claim 1, further comprising:
   setting a deadline for each party to respond to a respective reserve request.

3. The method of claim 1, further comprising refraining from notifying the second party of the second reserve request.

4. The method of claim 1, further comprising enabling the third party to cancel the second reserve request at any time prior to notification of the second party of the availability by the third party of the at least one third item for trade.

5. The method of claim 1, further comprising:
   queuing subsequent reserve requests for the at least one second item based on time of generation of the subsequent reserve requests; and
   notifying the second party of a subsequent reserve request in a queue for the at least one second item only after a party rejects a reserve request or does not respond to a reserve request within the response deadline to thereby enable the second party to enter into a new barter transaction for the at least one second item.

6. The method of claim 5, further comprising refraining from notifying the second party of a queued reserve request.

7. The method of claim 5, further comprising enabling the third party to cancel a queued reserve request at any time prior to notification to the second party of the queued reserve request.

8. The method of claim 1, further comprising:
   providing a server containing the one or more barter listings; and
   enabling access to the barter listings of the server from at least one terminal via a communications network.

9. The method of claim 1, further comprising arranging for secure shipment of the at least one first item and the at least one second item upon confirmation of the first reserve request.

10. The method of claim 1, further comprising arranging for secure shipment of the at least one second item and the at least one third item upon confirmation of the second reserve request.

11. A non-transitory computer readable medium comprising instructions which when executed by a computer cause the computer to perform the following steps:
   receiving one or more barter listings each including one or more items sought to be traded and one or more descriptions of one or more items sought to be acquired;
   searching, using a computer processor, for at least one first item from the one or more barter listings;
   creating a barter offer including a request to exchange the at least one first item from the first party for at least one second item from a second party;
   generating a first reserve request for the at least one second item and preventing the second party from both entering into other barter offers and from cancelling the first reserve request until the first party confirms or rejects the first reserve request or a first predetermined period of time expires;
   generating a second reserve request to exchange the at least one second item in for at least one third item, wherein the second reserve request is generated for a third party and queued behind the first reserve request;
   if the first party confirms the first reserve request, notifying the second party of the completion of the barter offer;
   if the first party rejects the first reserve request or the first predetermined period of time expires, notifying the second party of second reserve request and preventing the third party from both entering into other barter offers and from cancelling the second reserve request until the second party confirms or rejects the second reserve request or a second predetermined period of time expires.

12. The non-transitory computer-readable medium of claim 11, further comprising:
   setting a deadline for each party to respond to a respective reserve request.

13. The non-transitory computer-readable medium of claim 11, further comprising refraining from notifying the second party of the second reserve request.

14. The non-transitory computer-readable medium of claim 11, further comprising enabling the third party to cancel the second reserve request at any time prior to notification of the second party of the availability by the third party of the at least one third item for trade.

15. The non-transitory computer-readable medium of claim 11, further comprising:
   queuing subsequent reserve requests for the at least one second item based on time of generation of the subsequent reserve requests; and
   notifying the second party of a subsequent reserve request in a queue for the at least one second item only after a party rejects a reserve request or does not respond to a reserve request within the response deadline to thereby enable the second party to enter into a new barter transaction for the at least one second item.

16. The non-transitory computer-readable medium of claim 15, further comprising refraining from notifying the second party of a queued reserve request.

17. The non-transitory computer-readable medium of claim 15, further comprising enabling the third party to cancel a queued reserve request at any time prior to notification to the second party of the queued reserve request.

18. The non-transitory computer-readable medium of claim 11, further comprising:
providing a server containing the one or more barter listings; and
enabling access to the barter listings of the server from at least one terminal via a communications network.

19. The non-transitory computer-readable medium of claim 11, further comprising arranging for secure shipment of the at least one first item and the at least one second item upon confirmation of the first reserve request.

20. The non-transitory computer-readable medium of claim 11, further comprising arranging for secure shipment of the at least one second item and the at least one third item upon confirmation of the second reserve request.

21. A system for conducting barter transactions between parties, comprising:
one or more computer processors;
one or more computer-readable memory connected to the one or more computer processors, wherein the one or more memory is configured to:
receive one or more barter listings each including one or more items sought to be traded and one or more descriptions of one or more items sought to be acquired;
search for at least one first item from the one or more barter listings;
create a barter offer including a request to exchange the at least one first item from the first party for at least one second item from a second party;
generate a first reserve request for the at least one second item and preventing the second party from both entering into other barter offers and from cancelling the first reserve request until the first party confirms or rejects the first reserve request or a first predetermined period of time expires;
generate a second reserve request to exchange the at least one second item in for at least one third item, wherein the second reserve request is generated for a third party and queued behind the first reserve request;
if the first party confirms the first reserve request, notify the second party of the completion of the barter offer; and
if the first party rejects the first reserve request or the first predetermined period of time expires, notify the second party of second reserve request and prevent the third party from both entering into other barter offers and from cancelling the second reserve request until the second party confirms or rejects the second reserve request or a second predetermined period of time expires.

22. The system of claim 21, wherein the one or more computer memory are further configured to:
set a deadline for each party to respond to a respective reserve request.

23. The system of claim 21, wherein the one or more computer memory are further configured to:
refrain from notifying the second party of the second reserve request.

24. The system of claim 21, wherein the one or more computer memory are further configured to:
enable the third party to cancel the second reserve request at any time prior to notification of the second party of the availability by the third party of the at least one third item for trade.

25. The system of claim 21, wherein the one or more computer memory are further configured to:
queue subsequent reserve requests for the at least one second item based on time of generation of the subsequent reserve requests; and
notify the second party of a subsequent reserve request in a queue for the at least one second item only after a party rejects a reserve request or does not respond to a reserve request within the response deadline to thereby enable the second party to enter into a new barter transaction for the at least one second item.

26. The system of claim 25, wherein the one or more computer memory are further configured to refrain from notifying the second party of a queued reserve request.

27. The system of claim 25, wherein the one or more computer memory are further configured to enable the third party to cancel a queued reserve request at any time prior to notification to the second party of the queued reserve request.

28. The system of claim 21, wherein the one or more computer memory are further configured to:
provide a server containing the one or more barter listings; and
enable access to the barter listings of the server from at least one terminal via a communications network.

29. The system of claim 21, wherein the one or more computer memory are further configured to arrange for secure shipment of the at least one first item and the at least one second item upon confirmation of the first reserve request.

30. The system of claim 21, wherein the one or more computer memory are further configured to arrange for secure shipment of the at least one second item and the at least one third item upon confirmation of the second reserve request.

* * * * *